March 5, 1968 R. RADEBOLD ET AL 3,371,609
CONVERTER APPARATUS
Filed April 26, 1965 4 Sheets-Sheet 1
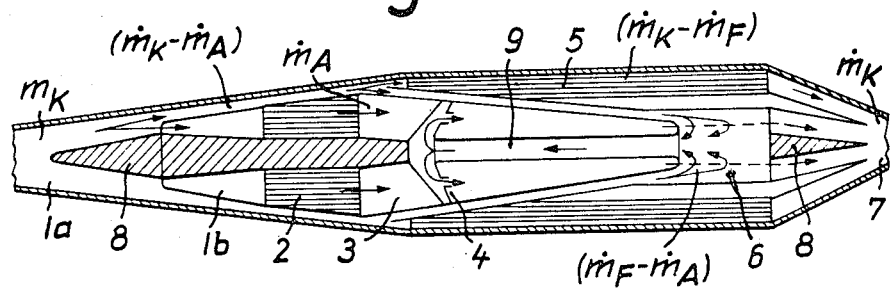
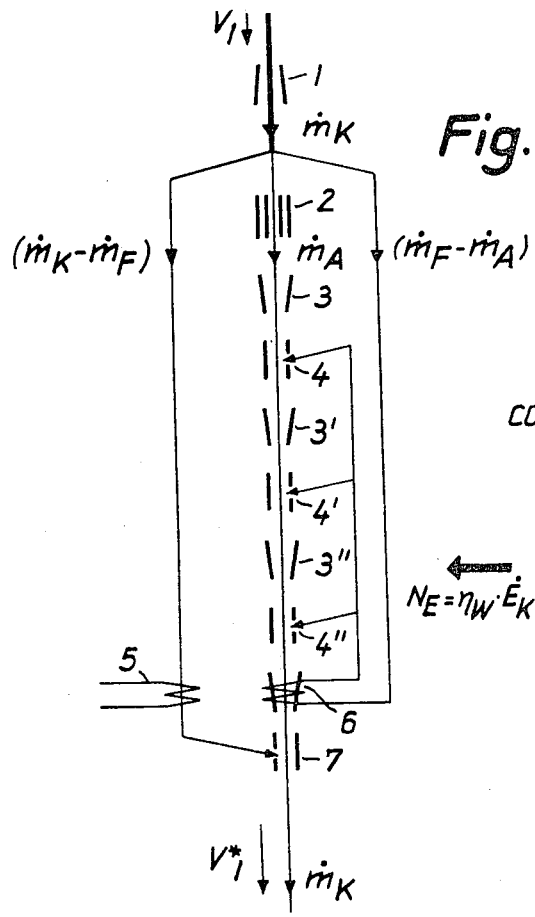
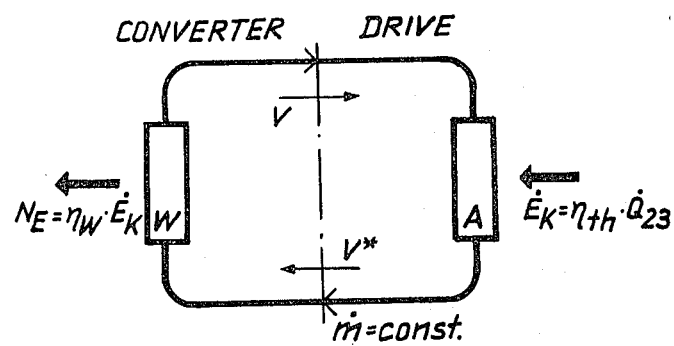
Inventor:
Reinhart Radebold
Hermann Lang
By: Spencer & Kaye
Attorneys

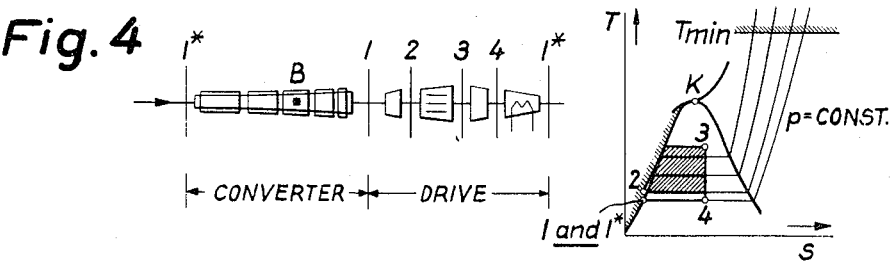
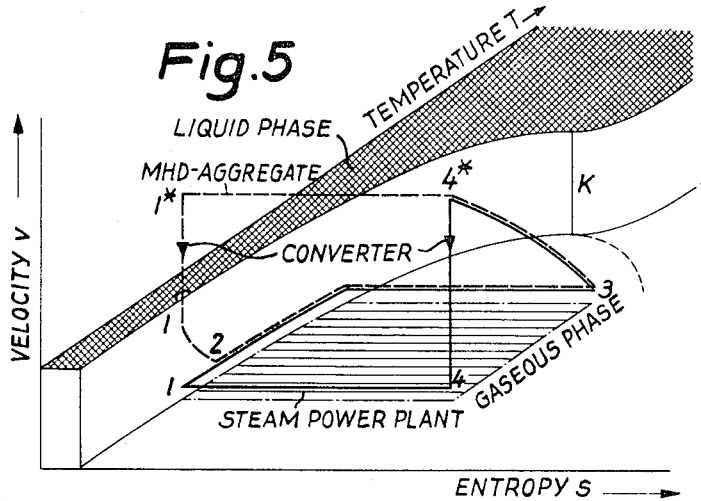
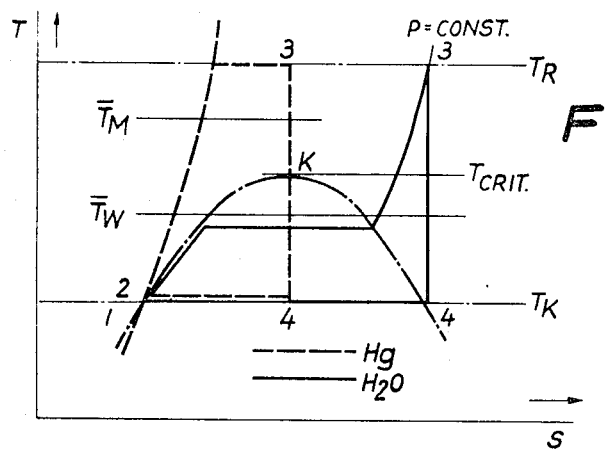
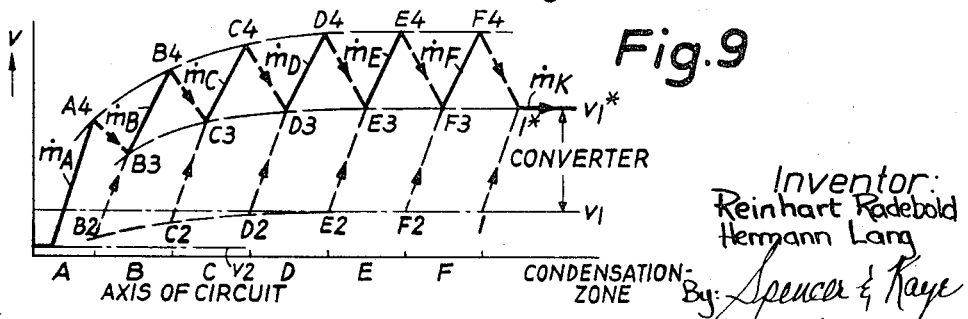

March 5, 1968  R. RADEBOLD ET AL  3,371,609
CONVERTER APPARATUS
Filed April 26, 1965  4 Sheets-Sheet 3

Inventor:
Reinhart Radebold
Hermann Lang
By: Spencer & Kaye
Attorneys

March 5, 1968 R. RADEBOLD ET AL 3,371,609
CONVERTER APPARATUS

Filed April 26, 1965 4 Sheets-Sheet 4

Inventor:
Reinhart Radebold
Hermann Lang
By: Spencer & Kaye
Attorneys

United States Patent Office
3,371,609
Patented Mar. 5, 1968

3,371,609
CONVERTER APPARATUS
Reinhart Radebold and Hermann Lang, Grosswelzheim, Germany, assignors to Licentia Patent-Verwaltungs-G.m.b.H., Theodor-Stern-Kai, Frankfurt am Main, Germany
Filed Apr. 26, 1965, Ser. No. 450,750
Claims priority, application Germany, Apr. 25, 1964, L 47,744
4 Claims. (Cl. 103—1)

ABSTRACT OF THE DISCLOSURE

A magneto-hydrodynamic energy converter operating on the ram jet tube principle in which the working medium is a liquid and the stream of the working liquid before it enters into the heat source is separated into two stream components of which the first is cooled and the second is regeneratively heated. After this they are at different places injected into the stream component which has passed through the heat source and has had its pressure reduced in a plurality of steps between which liquid working medium is admixed with the partly pressure-relieved vapor.

---

The present invention relates generally to the energy conversion art, and, more particularly, to a magnetohydrodynamic energy converter operating on the ram jet tube principle, hereinafter termed, for the sake of brevity, MHD ram jet tube, used for purposes of accelerating a working medium which itself is a liquid.

For purposes of converting, for example, nuclear energy, derived from splitting the atom, into electrical energy, it has been proposed to provide apparatus based on the combination of a metal-cooled nuclear reactor with a ram jet tube and a magnetohydrodynamic converter. The energy conversion is made possible, for example, due to the fact that the liquid metal in a reactor is partially vaporized, after which the pressure is reduced in a nozzle and, after waste heat has been given off, is made to flow in liquid state through a magnetohydrodynamic converter. After the medium has there had its kinetic energy converted into electric energy, it again passes through the reactor via a diffusor.

An object of the present invention is to provide an advantageous arrangement of a ram jet drive for accelerating a working medium which itself is liquid.

Another object is to provide a device of the character described wherein during injection condensation the velocity of the vapor is not too high.

In order to obtain a high efficiency thermodynamic cycle, the temperature difference which the working medium accelerating cycle passes through has to be as large as possible. This makes it necessary that, in the case of a single-stage pressure drop, the vapor be given a high velocity because of the large enthalpy difference which itself is due to the large temperature difference. In order to avoid hydrodynamic losses, the velocity of the vapor, during injection condensation, should not be too high. It is this requirement which underlies the present invention.

The above-mentioned requirement is achieved in that, in the case of a ram jet tube drive for a working medium which itself is liquid, the stream $m_k$ of the working medium, prior to its entry into the heat source, has two stream components (partial streams) $m_k - m_F$ and $m_F - m_A$ taken from it, of which the first is cooled and the second is regeneratively heated, whereafter both are, at different places, injected into the stream component $m_A$ which has passed through the heat source and then had its pressure reduced.

According to the present invention, therefore, the pressure drop is carried out in a plurality of steps, between which liquid working medium is admixed with the partly pressure-relieved vapor. This step-wise admixing and pressure relieving, which in actual practice can also be achieved by continuously admixing during the pressure-dropping, distributes the enthalpy of the stream component $m_A$ which comes out of the heat source over a stream of larger mass, and at the same time the stream component $m_F$ which enters into the condensation zone will have a lower velocity. The waste heat of this cycle has to be carried off. This is achieved in that the liquid stream component $m_k - m_F$ which has been cooled down, is applied after the pressure drop, so that the condensation is brought about by admixing.

Additional objects and advantages of the present invention will become apparent upon consideration of the following description when taken in conjunction with the accompanying drawings in which:

FIGURE 1 is a diagrammatic sectional view through a ram jet tube.

FIGURE 2 is a flow diagram showing the masses of streams in the ram jet tube.

Figure 7:
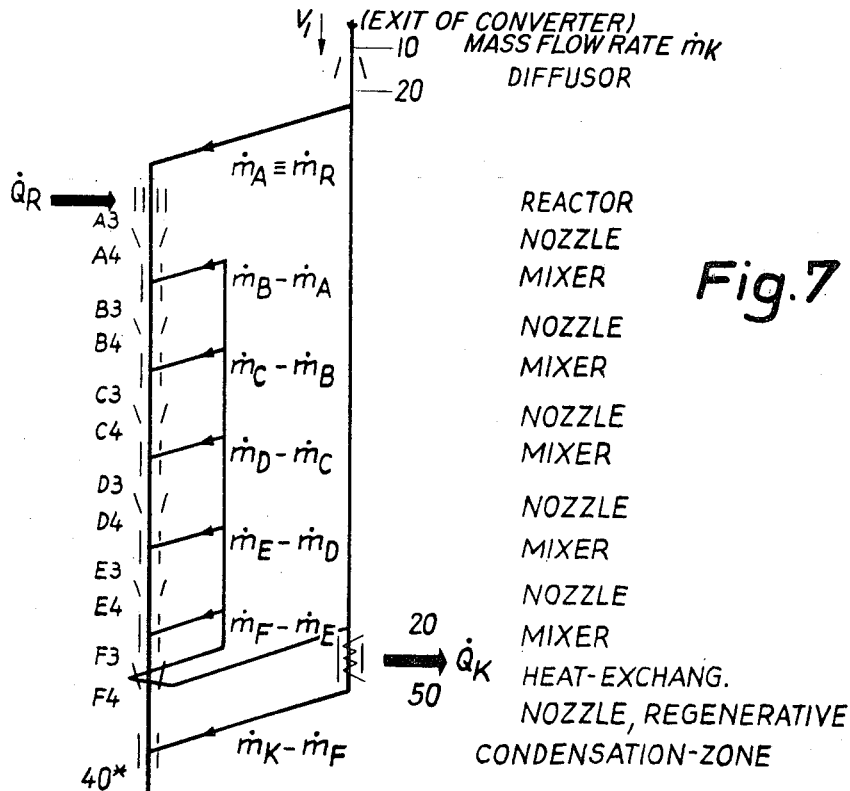

With more particular reference to the drawings, FIGURE 1 shows a diffusor 1, heat source 2, first pressure drop nozzle 3, and an admixing stage 4.

The further admixing stages and pressure reducing nozzle 3, and an admixing stage 4.

The further admixing stages and pressure reducing nozzles are not illustrated in the figure.

Also shown is a heat exchanger 5, as is the cooled nozzle 6 in which the stream component $m_F - m_A$ is regeneratively heated. Inasmuch as, during the pressure dropping in the last stage, the specific volume of the mass of current increases substantially, the latter must, in this last stage, be cooled during the pressure dropping. This is brought about in that the stream component $m_F - m_A$ which is to be admixed, is regeneratively heated in this last stage.

The condensation zone is shown at 7, while 9 indicates the lead-in conduit of the regeneratively heated stream component to the admixing paths.

The function and operation of the ram jet drive will be seen from the flow diagram of FIGURE 2. The incoming mass of flow is rammed up into the diffusor 1. It is here that the stream is divided into stream components $m_A$ as well as $m_k - m_F$ and $m_F - m_A$. The component $m_A$ is vaporized in the heat source 2 and is partly pressure-relieved in the first pressure relief nozzle 3. The component $m_F - m_A$ is first regeneratively heated by the cooled nozzle 6 and is then applied to the individual admixing paths 4, 4' and 4'', where it is admixed. The component $m_k - m_F$ passes through the heat exchanger 5, where it is cooled by an external coolant and is then injected into the condensation zone 7, where the condensation of the mass stream $m_F$ is brought about. The mass stream $m_k$ which is the sum of the injected cooled mass stream $m_k - m_F$ and the stream component $m_F$ which leaves the ram jet tube, having there been accelerated. The entry velocity into the ram jet tube is indicated as $v_1$, the exit velocity out of the ram jet tube is indicated as $v^*_1$. Connected to the output of the ram jet tube is an energy converter (not shown) for example an MHD generator which converts the flow energy of the flowing working medium into electric energy. The working medium passing through the converter can then once again be applied back to the input of the ram jet tube.

The drawings are intended to illustrate only the principle on which the present invention is based.

It will be understood that the above description of the present invention is susceptible to various modifications, changes, and adaptations, and the same are intended to be comprehended within the meaning and range of equivalents of the appended claims.

In order to facilitate a more complete appreciation of the present invention, attention is directed to the attached appendix, which contains a project report involving the present invention, this appendix being made a part of the instant specification. FIGURES 3 to 10, inclusive, referred to in the appendix, also appear in the accompanying drawings.

Appendix.—Introduction

Liquid metals as working fluid for MHD converters are of special interest because of their high conductivity at lower temperatures when compared to ionized gases. A magnetic Reynolds number $R_m$ in the order of ten at velocities of about 40 m./s. and a negligibly small Hall effect permit inductive generation of AC power in the kv. range. Even when using conventional magnetic fields in the converter power densities in the order of 70 W./cm.³ and higher are thought possible.

The problem in connection with nuclear energy conversion is how to accelerate the liquid metal with high efficiency in a closed circuit of which the MHD converter is one part. Any such acceleration device will be based in principle on the same idea: The working fluid leaving the MHD converter will first be raised to a higher (static) pressure, probably in a diffuser using its residual kinetic energy. The stream of fluid then will be divided into two parts. One stream passes through the reactor and will be vaporized and accelerated in the expansion nozzle, while the other passes through a liquid-liquid heat exchanger in which it will be cooled down. By a subsequent turbulent intermingling of both streams condensation will take place, after which the resulting stream of fluid enters the MHD converter in a liquid state at elevated velocity. The problem consists in the high hydrodynamic losses during condensation following a single-stage expansion because of the rather different velocities of both streams. In the MHD ram jet the above-mentioned problem will be overcome by a thermodynamic transformation of the energy available in the "hot" stream. During expansion the mass flow rate of this stream will be raised while its specific enthalpy will be lowered.

In this appendix, reference will be made to the following figures which also appear in the accompanying drawings:

FIGURE 3 is a schematic diagram showing the basic concept of the fluid dynamics conversion process.

FIGURE 4 is a schematic representation of the conversion process in an MHD-ram jet.

FIGURE 5 is a plot showing the conversion processes in a steam power plant and an MHD ram jet system, the plot showing the velocity $v$, the temperature T and the entropy $s$.

FIGURE 6 is a plot of the temperature T and the entropy $s$ of the Rankline-cycles for Hg and $H_2O$ with $T_R > T_{crit}$.

FIGURE 7 shows a mass flow diagram of the thermodynamic $\dot{m}-i$ transformation, and is analogous to FIGURE 2 of the above specification.

Figure 8:
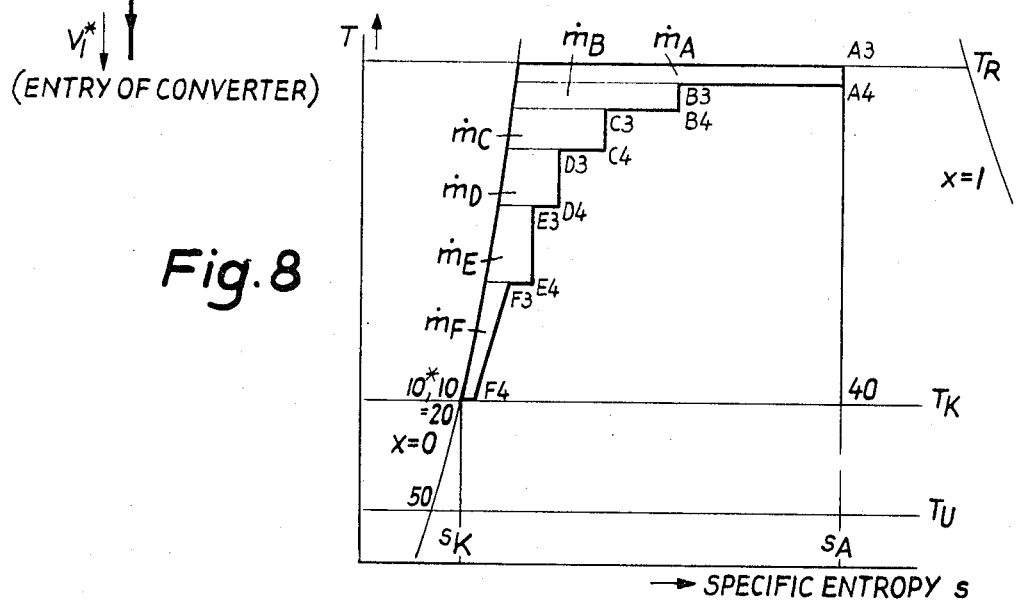

FIGURE 8 is a temperature versus specific entropy diagram of the thermodynamic transformation.

FIGURE 9 is a velocity diagram of the thermodynamic $\dot{m}-i$ transformation.

Figure 10:
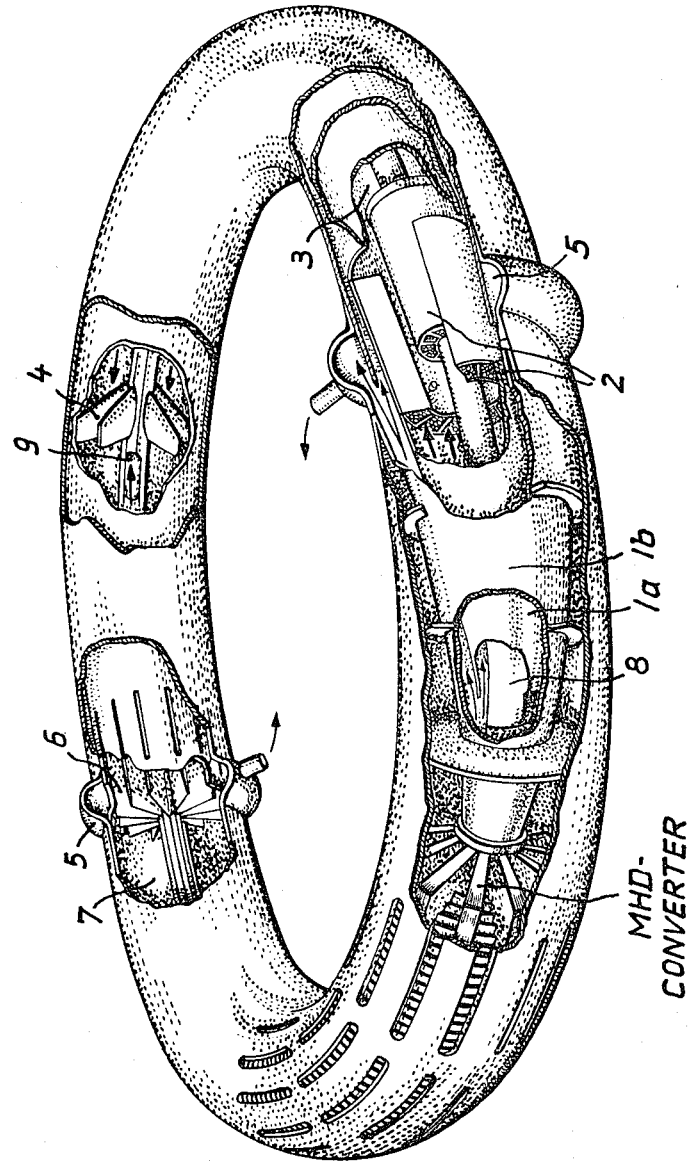

FIGURE 10 is a perspective view of an MHD ram jet tube.

The MHD ram jet project deals with the direct energy conversion of nuclear fission heat into A.C.-power in the kilovolt range with a liquid metal working fluid.

This project is based on a liquid metal cooled, possibly fast reactor which provides the nuclear heat source for the conversion process. The following are the properties thought typical for the reactor:

A—The temperature $T_R \cong 600°$ C. of the fuel elements is always much lower than the critical temperature $T_{crit}$ of the coolant.

B—The average power density $\dot{q}_R$ in the reactor core is about 500 watts per cubic centimeter.

The MHD ram jet forms a self-contained closed circuit including the reactor without any moving parts except the circulating metal. The working fluid will be accelerated within the drive A after the heat flow $\dot{Q}_{23}$ from the reactor has been introduced. The kinetic energy of the fluid $\dot{E}_K$ so gained will then be changed into A.C. power $N_E$ within the MHD converter W which forms the other part of the circuit as shown in FIGURE 3.

The three significant properties of the working fluid are fully exploited during thermodynamic acceleration and magnetohydrodynamic deceleration. These properties are the high thermal as well as electrical conductivity and take the form of a fog-like two-phase mixture. (1)

(1) See Bibliographical References at end of specification.

Conversion process and MHD ram jet are shown schematically in FIGURE 4. The working fluid leaving the MHD converted in state 1 possesses sufficient residual kinetic energy to be compressed in a diffusor 1–2 to the pressure which belongs to reactor temperature $T_R$. Between states 2 and 3 it rises in temperature and vaporizes to form the fog-like two-phase mixture. The stream of fluid expands and so accelerates in the subsequent nozzle 3–4 until state 4 at the lower temperature $T_K$ of the process is reached. Condensation zone 4–1* is passed through where the fluid liquifies and where the waste heat is rejected. This dissipation may be left to radiation or to convection by an external coolant. The stream of fluid is now able to enter the MHD converter 1—1* in a liquid state with a rise in velocity.

This conversion process differs significantly from that in a conventional steam power plant as may be seen from the temperature entropy $T-s$ diagram FIGURE 5 on which velocity $v$ is the third coordinate. The difference of both conversion processes lies in the sequence of condensation and energy extraction in the MHD converter and in the rotor of the turbine-generator respectively. In the steam power plant energy is extracted from the stream before condensation, the fluid being in the gas-phase while conversely in the MHD plant the working fluid is a liquid.

Before arriving at a detailed discussion of acceleration and deceleration of the working fluid, it is best to point out the close relationship of both processes in respect to thermodynamics. If one projects both conversion processes represented in the $v-T-s$ diagram FIGURE 5 into the "thermodynamic" $T-s$ plane, one will find both projections to be Rankine-cycles. This raises the question: why then use the MHD process instead of that in a conventional steam power plant fed by the nuclear heat source. (2) The (2) See notes at end of specification.

answer may be seen from FIGURE 6, in which Rankine-cycles for both $H_2O$ and Hg are shown with reactor temperature $T_R$ higher than the critical temperature $T_{crit}$ of $H_2O$. The Carnot-factors $\eta_C$ of both cycles are the same because of the identity of temperatures $T_R$ and $T_K$; in spite of this the thermodynamic efficiency $\eta_{th}$ of the $H_2O$-cycle is much lower than that of the Hg cycle resulting from the higher means temperature $\bar{T}_M$ of the metal: In case of the $H_2O$-cycle, heat flow from the heat source enters at a temperature varying over a wide range because superheating occurs. In case of the Hg-cycle no superheating is needed; the high critical temperatures of all metals as well as the steep liquid boundary $x=0$ leads to a thermodynamic efficiency $\eta_{th}$ close to the Carnot-factor.

Even when making use of reheat in a steam power plant and so improving its thermodynamic efficiency, power densities $\dot{q}_P$ in both conversion plants differs by several orders of magnitude. In the MHD ram jet the power densities in the converter and in the remaining zones are of the same order compared to that in the reactor which is impossible to achieve in a steam power plant. This fact, the lack of moving parts (except reactor control mechanism), and the compactness in design present definite technological advantages in the operation and construction of such conversion plant.

Thermodynamic acceleration of a liquid metal

Probably the most difficult problem met with this conversion process, and which is solved by the invention described in the foregoing specification, is the thermodynamic acceleration of the liquid metal working fluid. The fluid stream is passing through the reactor takes over the heat flow $\dot{Q}_{23}$. The energy $\dot{E}_K$ available in the fluid (i.e., the energy of the fluid (3) so gained is:

(3) See Bibliographical References at end of specification.

$$(1) \qquad \dot{E}_K = \eta_{th}\dot{Q}_{23} = \dot{m}_A(i_3 - i_4) = \dot{m}_A e_A$$

$\dot{m}_A$ stands for the mass flow rate, $i$ for the specific enthalpy and $e_A$ for the specific exergy of the stream. In the simple case as shown in FIGURE 5, $\dot{E}_K$ will be converted into kinetic energy of the fluid during single-stage expansion in a nozzle. The velocity rises from $v_1$ to $v_4^* > v_1$:

$$(2) \qquad \dot{E}_K = \dot{m}_A e_A = \frac{\dot{m}A}{2}(v_4^{*2} - v_1^2)$$

To liquify this fast "hot" stream, which is the condition for its entry into the MHD converter, condensation has to be effected by mixing with a second stream of fluid. This has been earlier subcooled in a liquid-liquid heat exchanger parallel to the reactor. The difficulty of this concept arranges from the high velocity of the "hot" stream compared to that of the "cold" stream. When a thermodynamic efficiency $\eta_{th}$ of about 0.5 is assumed, the velocity $v_4^*$ of sodium or mercury is of the order of some hundred meters per second while the velocity of the cold stream is as low as that of the stream leaving the converter. The low hydrodynamic efficiency resulting from high impact losses adversely affects the thermodynamic efficiency even when disregarding the rather high friction losses in the converter. Condensation of the fast hot stream in a vapor-liquid heat exchanger is a poor alternative because of the high friction losses on the large surface area needed for heat transfer.

One of the possibilities to overcome this problem satisfactorily has proved to be the thermodynamic $\dot{m}-i$ transformation, the basic idea of which is the following:

The available energy (i.e., exergy) $\dot{E}_K$ is imparted to the fluid by the reactor. This is independent of the way this energy will be converted or extracted later. During a single-stage expansion, $\dot{E}_K$ contained in the stream of fluid is completely utilized for its acceleration (2). A somewhat lower velocity however is desired at end of acceleration as explained earlier. For this reason $\dot{E}_K$ has to be converted into kinetic energy of a fluid stream with a higher mass flow rate $\dot{m}_K > \dot{m}_A$:

$$(3) \qquad \dot{E}_K = \dot{m}_A e_A \geq \frac{\dot{m}}{2}K(v_1^{*2} - v_1^2)$$

In this case the available energy $\dot{E}_K$, gained by a stream with mass flow rate $\dot{m}_A$, should be spread over to another stream of an increasing instead of a constant mass flow rate during a more complicated process of acceleration. (The inequality holds for considering the transformation losses.)

The flow scheme and the thermodynamic diagrams of the $\dot{m}-i$ transformation are shown in FIGURES 7 and 8. The mass flow rate of the total stream of fluid leaving the MHD converter with velocity $v_1$ in state 10 is $\dot{m}_K$. One part of this stream with mass flow rate $\dot{m}_A$ passes through the reactor; thereafter the fraction $(e_A - e'_A)$ of its specific exergy is converted into kinetic energy:

$$[e_A - e'_A \equiv i_{A3} - i_{A4}]$$

$$(4) \qquad \dot{m}_A e_A = \dot{m}_A \left[ e'_A + \frac{1}{2}(v_{A4}^2 - v_1^2) \right]$$

Velocity rises from $v_1$ to $v_{A4}$ as shown in FIGURE 9. After intermingling with a second stream $(\dot{m}_B - \dot{m}_A)$ at state 10, the first step of transformation has been performed, for the resulting stream with mass flow rate $\dot{m}_B = \ddot{u}_B \dot{m}_A$ whereas $\ddot{u}_B > 1$, $$(5) \qquad \dot{m}_A + (\dot{m}_B - \dot{m}_A) = \dot{m}_B$$

reaches its equilibrium state $B_3$. The velocity of this new stream is $v_{B3}$, while the energy available in it is $e_B$. $N_{vA}$ stands for the transformation losses to be discussed later:

$$(6) \qquad \dot{E}_K = \dot{m}_B \left[ e_B + \frac{1}{2}(v_{B3}^2 - v_1^2) \right] + N_{vA}$$

In the $n=F$.th step of transformation exergy is completely converted at state F4. In the example of FIGURES 7, 8 and 9, which involves a $\dot{m}-i$ transformation, there are $n=4$ stages.

The pressure reducing nozzle of this last stage has the additional task to preheat the entire stream $(\dot{m}_F - \dot{m}_A)$ which is to be injected, and therefore operates as a regenerative cooled nozzle. The basic reason behind this step is not so much to improve the thermodynamic efficiency of the Carnotizing, but to see to it that the pressure reduction in this last stage takes place with as constant a specific volume as possible. This regenerative nozzle in this last stage of the thermodynamic transformation is thus a significant feature of the invention described in the foregoing specification, in that it makes it possible to keep the cross section of the transformation zone as constant as possible. This last step finishes by mixing $\dot{m}_F$ with the subcooled stream $(\dot{m}_K - \dot{m}_F)$ in order to liquify the fluid; the velocity at the end of acceleration of the total stream $\dot{m}_K$ yields $v_1^*$ in state $10^*$:

$$(7) \qquad \dot{E}_K = \dot{m}_K \left[ 0 + \frac{1}{2}(v_1^{*2} - v_1^2) \right] + \sum_{u=1}^{F} N_{vn}$$

The effectivity (i.e., exergetic efficiency) $\varphi_{Tr}$ of the transformation derives from (7) and leads to:

$$(8) \qquad \varphi_{Tr} = \left( 1 - \frac{\sum\limits^{F} N_{vn}}{\dot{E}_K} \right)$$

The velocity of the fluid stream in the respective steps of transformation oscillates between two boundaries the lower of which defines the velocity after mixing. The resulting fluid velocity $v_{B3}$ for instance derives from:

$$(9) \qquad \dot{m}_A(v_{A4} - v_{B3}) = (\dot{m}_B - \dot{m}_A)(v_{B3} - v_1)$$

The striking fact of the transformation is this resulting velocity smoothly to blend in after a few steps with that wanted at end of transformation. The velocity prevailing at the entrance of converter depends only slightly upon the number F of steps, when a constant transformation mass ratio $\ddot{u}$ and fraction of total exergy converted are assumed.

The following are the losses of transformation thought of importance: Friction in nozzles and mixers, impact of the accelerated two-phase mixture on the injected and dispersed liquid phase in regard to (9), and increase of entropy resulting from heat exchange at variable temperature during intermingling. Friction seems to be low because of the high specific volumes of fluid in nearly all steps. Entropy rises are to be neglected in the last, "weightier" steps because of the steep liquid boundary $x=0$ of metals. Impact losses determine the effectivity however; because the relative velocity of hot and cold stream in the last steps is low compared to that after single-stage expansion, impact losses are also low.

The effectivity $\varphi_{Tr}$ of this transformation of mass flow rate and specific enthalpy (difference) has been calculated for $Na$ and $Hg$ and working fluids, when a thermodynamic efficiency $\eta_{th} \approx 0.5$ of the conversion process is assumed. For nearly any desired velocity $v_1^*$ at end of transformation an effectivity of about $\varphi_{Tr}=0.8$ might be possible.

*Design studies of the MHD ram jet*

Once the theoretical background for the MHD conversion process had been clarified, a beginning was made with designing a practicable generating plant rated at 500 kilowatts electrically. This design is illustrated in a perspective sectional view FIGURE 10, in which the parts are referenced by the same numerals as in FIGURE 1. The probable working dimensions of the individual components made it advisable to adopt an annular form incorporating two linear units. One unit contains the liquid metal-cooled reactor, the other represents the regenerative heat exchanger. The two arcs joining together the two linear units respectively house the thermodynamic transformation zone and the MHD converter with the subsequent diffusor.

This design could be finalized after the assurance had been gained that the two arcuate units were unlikely to depress the gross efficiency. The major part of the circuit is filled with a fog-like liquid-gas phase mixture. It is only the liquid phase which encounters heavy frictional loss.

The curving diffusor suffers no greater loss than would a linear one, (4) and such loss anyway is only due to (4) See notes at end of specification.

the residual kinetic energy.

Going from the general to the particular, the pressure-type converter is of an annular shape. This design is known from that of the MHD pumps and hence need not be discussed further.

The diffusor is made up of two concentric components of which the outer diffusor decelerates the working medium before its separation into two streams. One stream passes through the radiator heat exchanger for subcooling, the other stream passes through the regenerative heat exchanger and is then injected during thermodynamic transformation as described earlier on.

The inner diffusor serves to delay some 5 percent of the total mass flow and raises this to the reactor pressure level. The reactor is composed of two coaxial and expanding tubes of which the inner movable tube effects reactor control and scram. The requisite control mechanism is built into the inner coaxial core tube.

The transformation zone consists of alternating nozzle and mixer stages having approximately equal cross section. Injection is effected via radially disposed nozzle tubes fed from the inner coaxial core tube.

The regenerative heat exchanger terminates the zone of transformation and serves to raise the thermodynamic efficiency by preheating that mass flow which is injected into the transformation zone. Simultaneously, expansion in this unit which represents the end stage of the transformation zone is made to take place at a constant specific volume.

The principal data of the 500 kw. generating plant are subsequently enumerated, quoting also and in comparison the relevant data for an MPD conversion process.

Working fluid—$Na$ (gas)
Reactor inlet temperature—550° C. (>1,000° C.)
Reactor outlet temperature—950° C. (>2,000° C.)
Inner reactor diameter—8 cm.
Outer reactor diameter (in average)—40 cm.
Number of transformation steps—6 (1)
Maximum velocity during transformation—140 m./s. (~velocity of sound)
Velocity in MHD duct—50 m./s. (~velocity of sound)
Conductivity in MHD duct—$2 \cdot 10^5$ ($\Omega$ cm.)$^{-1}$ ($10^{-1}(\Omega$ cm.)$^{-1}$)
Temperature in MHD duct—550° C. (>2,000° C.)
Electrical power generation—A.C. power, D.C. power
Ratio of compression work to power output—0.08 (0.3–0.4)
Average diameter of MHD ram jet—400 cm.

A 50 megawatt, 20 kv., 50 cycles per second, electrical plant was tentatively designed in order to determine the relationship governing overall output and gross efficiency. Structural design is similar to that of the annulus being merely expanded. Overall efficiency is estimated at 32 percent when running on mercury at temperatures from 600° C. to 160° C.

*List of symbols*

$Q_{23}$—Heat flow from reactor, watts
$E_K$—Exergy, i.e., energy available in fluid, watts
$N_E$—Electrical power output, watts
$\dot{m}$—Mass flow rate, gram s.$^{-1}$
$i$—Specific enthalpy, cal. g.$^{-1}$
$e$—Specific exergy, cal. g.$^{-1}$
$s$—Specific entropy, cal. g.$^{-1}$ deg.$^{-1}$
$T$—Absolute temperature, deg. centigrade
$x$—Steam quality, deg. centigrade
$n$—Index of transformation step, deg. centigrade
$\ddot{u}_n$—Transformation mass ratio of step $n$, deg. centigrade
$N_{vn}$—Transformation loss in step $n$, watts
$\eta_{th}$—Carnot-factor of conversion process
$\eta_{th}$—Thermodynamic efficiency
$\eta_w$—Converter efficiency (over all)
$\varphi_{Tr}$—Effectivity (exergetic efficiency) of $m$–$i$ transformation
$v$—Velocity of fluid, $ms^{-1}$
$v_s$—Velocity of travelling field, $ms^{-1}$
$\bar{v}^*$—Characteristic velocity, $ms^{-1}$
$B$—Magnetic flux density, $Vsm^{-2}$
$s$—Slip=$(v_s-v)/v_s$
$f$—Frequency, cycles $s^{-1}$
$\sigma$—Conductivity, (ohm cm.)$^{-1}$
$R_m$—Magnetic Reynolds-number
$L$—Converter length, $m$
$q_R$—Power density in reactor core, watts cm.$^{-3}$
$q_P$—Power density in conversion plant, watts cm.$^{-3}$
$q_n$—Electrical power density in converter, watts cm.$^{-3}$
$q_v$—Dissipative power density in converter, watts cm.$^{-3}$
$n_H$—Hydraulic power density in converter, watts cm.$^{-3}$

BIBLIOGRAPHICAL REFERENCES (1) A. R. SMITH, E. S. THOMPSON: "The Mercury Vapor Process" Transact. ASME (Oct. 1942) p. 625–464

(2) W. D. JACKSON, E. S. PIERSON: "Operating Characteristics of the MHD-Induction Generator" Symposium on Magnetoplasmadynamic Power Generation, Newcastle (1962).

(3) H. D. BAEHR: "Thermodynamik" 1. Auflage, Springer Verlag, Berlin, Göttingen, Heidelberg (4) H. SPRENGER: "Experimentelle Untersuchungen an geraden und gekrümmten Diffusoren" Mitt. Inst. f. Aerodynamik ETH Zürich, 27 (1959)

It will be understood that the above description of the present invention is susceptible to various modifications, changes and adaptations, and the same are intended to be comprehended within the meaning and range of equivalents of the appended claims.

What is claimed is:

1. A ram jet tube drive for a working medium which itself is a liquid, comprising, in combination:
   (a) means for separating a stream $m_k$ of working medium into a main stream $m_A$ and two stream components $m_k-m_I$ and $m_F-m_A$;
   (b) a heat source disposed downstream of said separating means and in the path of flow of the main stream $m_A$ for heating the latter;
   (c) means downstream of said heat source for pressure relieving said main stream;
   (d) means for cooling the first stream $m_k-m_I$;
   (e) means for regeneratively heating the second stream $m_F-m_A$; and
   (f) means for injecting the cooled first stream and heated second stream into the main stream at different places.

2. A device as defined in claim 1 wherein said injecting means admix portions of said second stream with said main stream at a plurality of places to increase the main stream component.

3. A device as defined in claim 2 wherein said heating means is arranged to take heat from the main stream at a place downstream of the injecting means and use it for heating said second stream before it passes to the injecting means.

4. A device as defined in claim 3 wherein there are a plurality of pressure relief nozzles for relieving the pressure of the main stream, said heating means taking heat from the last of such nozzles for use in heating the second stream.

References Cited
UNITED STATES PATENTS

| | | | |
|---|---|---|---|
| 3,103,783 | 9/1963 | Smith | 103—1 |
| 3,138,919 | 6/1964 | Dentsch | 103—1 |

HENRY F. RADUAZO, *Primary Examiner.*

DONLEY J. STOCKING, *Examiner.*